Dec. 16, 1958 C. W. ANDERSON Re. 24,576

DIAMOND CUT-OFF WHEEL

Original Filed Aug. 27, 1956 2 Sheets-Sheet 1

INVENTOR
CLARENCE W. ANDERSON

BY [signature]
ATTORNEY

DIAMOND CUT-OFF WHEEL

Original Filed Aug. 27, 1956 2 Sheets-Sheet 2

INVENTOR
CLARENCE W. ANDERSON

BY George Hamilton
ATTORNEY

United States Patent Office

Re. 24,576
Reissued Dec. 16, 1958

24,576

DIAMOND CUT-OFF WHEEL

Clarence W. Anderson, Holden, Mass., assignor to Norton Company, Worcester, Mass., a corporation of Massachusetts Original No. 2,796,706, dated June 25, 1957, Serial No. 606,439, August 27, 1956. Application for reissue July 11, 1958, Serial No. 755,820

2 Claims. (Cl. 51—206)

Matter enclosed in heavy brackets [ ] appears in the original patent but forms no part of this reissue specification; matter printed in italics indicates the additions made by reissue.

The invention relates to diamond cut-off wheels.

One object of the invention is to provide a diamond cut-off wheel of long life. Another object is to reduce erosion of the steel center, especially adjacent the segments. Another object is to provide an improved structure for such wheels which can be easily manufactured. Another object of the invention is to provide superior metal bonded diamond abrasive segments for the construction of cut-off wheels. Wheels which are used to slot concrete are referred to as cut-off wheels.

Other objects will be in part obvious, or in part pointed out hereinafter.

Figure 1:
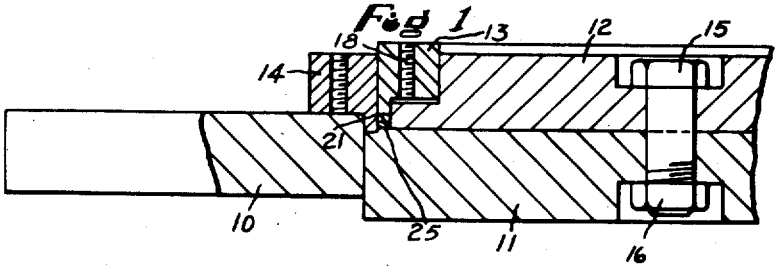
Figure 2:
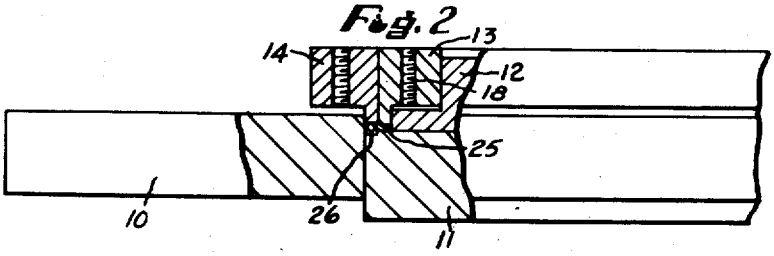
Figure 3:
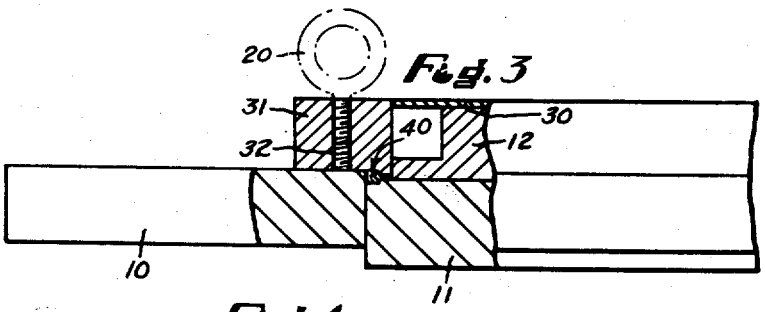
Figure 4:
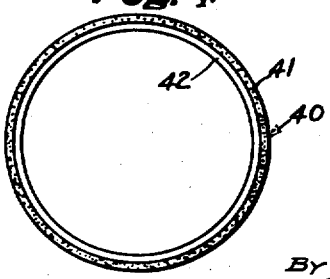
Figure 7:
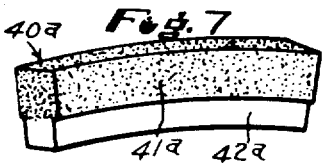
Figure 5:
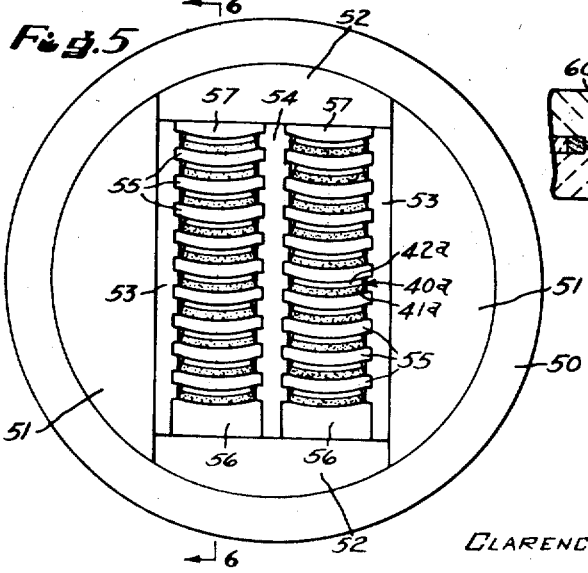
Figure 6:
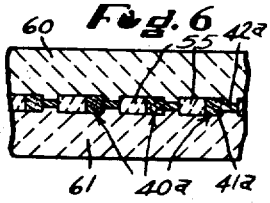

In the accompanying drawings illustrating the manufacture of a cut-off wheel in accordance with this invention and also the wheel made thereby, Figure 1 is a partial diametral sectional view of a closed mold showing the first step in the manufacture of the wheel, Figure 2 is a similar sectional view showing the second step in the manufacture of a cut-off wheel, Figure 3 is also a similar sectional view showing the third step in the manufacture of the wheel, Figure 4 is a plan view of the diamond abrasive, tungsten carbide ring produced by the manufacturing steps of Figures 1, 2, and 3 on, however, a smaller scale, Figure 5 is a plan view of a mold for the hot pressing of the segments made by cutting the ring of Figure 4, on the scale of Figure 4, Figure 6 is a sectional view taken on the line 6—6 of Figure 5, Figure 7 is an isometric view of a diamond abrasive-tungsten carbide segment made in accordance with the invention, this figure being on a larger scale than Figures 1, 2, and 3.

Figure 8:
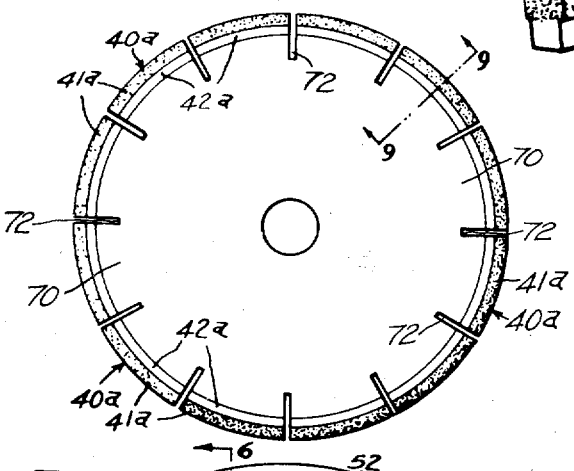
Figure 9:
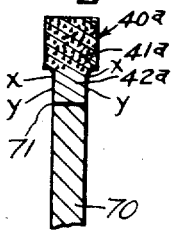

Figure 8 is an elevation of the completed cut-off wheel on a scale between that of Figures 1, 2, and 3 and that of Figure 4, Figure 9 is an axial sectional view taken on the line 9—9 of Figure 8.

For the manufacture of segments such as illustrated in Figure 7 I provide diamond grit and tungsten carbide molding powder and preferably also some sintered tungsten carbide in grit sizes ranging from 40 to 320. The grit size of the dimond may be anything at all, and is not critical. For cut-off wheels it is customary to use from 16 grit size to 100 grit size diamond abrasive. Neither is the concentration of the diamonds critical. It is pretty universal practice to make diamond abrasive wheels and segments in three concentrations, 100, 50, and 25. In the industry 100 concentration means about 25% diamond by volume, 50 concentration means about 12.5% diamond by volume, and 25 concentration means about 6.25% diamond by volume. These figures are approximate.

Tungsten carbide molding powder is a mixture of carbide powder and cobalt powder. This mixed powder is available on the market in grit sizes of from one of five microns. *However, I can use any powder which is fines finer than 180 grit size.* Furthermore, it is known that the tungsten carbide is replaced in whole or in part by either or both of titanium carbide and tantalum carbide in many molding powders so the carbide is selected from the group consisting of tungsten carbide, titanium carbide, and tantalum carbide and mixtures thereof. While nickel and iron have been proposed and to a certain extent used as the metal bond, and mixtures of all three of these metals have been used, cobalt is almost universally used today. The ratio, by weight in this case of the carbide to the cobalt can be anywhere from 20% to 80% and preferred mixtures are 40% carbide 60% cobalt, and 50% carbide 50% cobalt, and 60% carbide 40% cobalt.

The sintered carbide cobalt grit can have a composition that goes from 50% carbide, 50% cobalt to as high as 95% carbide and 5% cobalt. I have used grit consisting of 94% carbide, 6% cobalt and prefer grit sizes of 80 to 180. The carbide in the sintered carbide grit can be any of the three above mentioned and mixtures thereof.

Referring now to Figure 1 I provide a mold comprising a mold band 10 of annular shape, a bottom plate 11, a mold center 12, an inner top mold ring 13, and an outer top ring 14. The bottom plate 11 and the center 12 may be secured together by a bolt 15 and a nut 16. The ring 13 has threaded bores 18 for the insertion of screws such as the ring bolt 20 of Figure 3 to pull out th rings. The mold parts of Figure 1, as well as those of Figure 3 may be made of steel. Assembling the mold parts of Figure 1 all except the ring 13 leaves an annular groove 21 between the center 12 and the ring 14. Into this groove I spread the mixture of sintered carbide and carbide with cobalt molding powder, well mixed. I then insert the ring 13 and close the mold in an hydraulic press with a pressure which for example is two tons per square inch.

Removing the ring 14 which can now be done without spilling any of the sintered carbide and sintered powder with cobalt because the pressure has made this into a fairly strong ring 25, I thereby create an annular groove 26 into which I spread the mixture of diamond abrasive and carbide molding powder, including the cobalt which in every case is the real bonding material being a soft metal which readily sinters. I then reinsert the ring 14 as shown in Figure 2, and again press with a pressure which may be the same as for the first operation, namely two tons per square inch. Figure 2 shows the mold closed.

Referring now to Figure 3, both of the rings 13 and 14 have been removed. On top of the center 12 I place a spacing plate 30 for convenience; this is a steel disc. I provide a further outer ring 31 shaped as shown having threaded bores 32 for ring bolts 20. Figure 3 shows the mold closed, with the ring 31 down but in moving down it has moved the mold band 10. The mold assembly of Figure 3 is pressed in a hydraulic press with a greater pressure which usually is 50 tons to the square inch.

Having thus pressed the two mixtures together I open the mold of Figure 3, which can be readily done using the ring bolts 20, and take out the ring 40 consisting of a diamond-carbide cobalt annulus 41 integrally molded onto an annulus 42 of sintered carbide and carbide with cobalt molding powder. This ring 40 removed from the press of Figure 3 is shown in Figure 4. I then cut the ring 40 in the green state (meaning before sintering) into sectors 40a, Figure 7, consisting of sectors 41a molded onto sectors 42a.

The mold of Figure 5 comprises a graphite ring 50, graphite segments 51, truncated graphite segments 52, notched graphite bars 53 and 54, graphite spacer sectors 55 fitting in the notches of the bars 53 and 54 and graphite end blocks 56 and 57, all fitting together as shown in Figure 5 and leaving spaces for the insertion of the sectors 40a. Referring now to Figure 6, this mold is completed by a graphite top plate 60 and a graphite bottom plate 61 shaped to fit the sectors 40a which are loaded into the mold of Figures 5 and 6 as shown.

The loaded mold of Figures 5 and 6 is then taken to a hot press, not shown. This can be an induction heated hot press capable of producing a pressure of about two tons per square inch upon the mold plates 60 and 61. Such hot presses are regularly available and the heat is produced in the electrically conductive material in the press by a high frequency magnetic field produced by high frequency electric current in a coil of copper tubing through which cooling water is flowing. I then hot press the sectors 40a under pressure of two tons per square inch, the present preferred pressure which can be varied, while heating the sectors 40a to a temperature of between 1200° C. and 1300° C. This range of temperature is given because it is difficult to determine the exact temperature of the sectors during the heat treatment and I find that by attempting to reach 1250° C. very satisfactory results are achieved. When the mold of Figures 5 and 6 has cooled and the sectors 40a have been removed they are completed.

The sectors 40a are now welded to a steel center 70, Figure 8, by a technique such as fully described in the patent of my colleague Duane E. Webster, No. 2,488,151, dated November 15, 1949. This involves the use of strips of solder which, as shown in Figure 9, become integral junction portions 71. The steel center 70 has radial cuts 72 therein to space the sectors 40a which has a double advantage facilitating manufacture by the process of the Webster patent, and increasing the cutting ability of the cut-off wheel of the invention. The Webster patent mentions silver solder which I also prefer but other solders can be used. This step of uniting the sectors 40 integrally to the steel center 70, which is a disc with the cuts 72 and central hole 74, can be called welding or soldering or if brass is used it can be called brazing.

I have made tests comparing cut-off wheels as above described with cut-off wheels exactly the same except that they lacked the sectors 42a and instead the sectors 41a molded out of diamond-carbide and cobalt were soldered directly to the center 70. In order to make a fair comparison the outside diameters of the two wheels were the same which required the diameter of the center 70 for the wheel having no sectors 42a to be greater than the diameter of the invention wheel by twice the radius of a sector 42a. The mixture for the sectors 41a, and this can be understood to be a specific example for the present disclosure, was twenty-five concentration diamonds as previously defined, the diamonds being 36 grit size, with 12½ weight percent sintered carbide which was mainly tungsten carbide and acquired from Kennametal Incorporated under their brand mark K–6, with 87½ weight percent 50% [liquid] *by weight* tungsten carbide powder, 50% by weight cobalt which was also acquired from Kennametal with no brand mark, these percentages adding up to 100 and representing the bond component. The mixture for the sectors 42a, and this is further an example for the practicing of my invention, was 12½ weight percent sintered carbide, which was mostly tungsten carbide, and acquired from the Kennametal Incorporated and sold under their brand mark K–6, and the grit size of the sintered carbide was 80. With this was mixed 87½ weight percent of 50% by weight tungsten carbide from the last named company and sold under no brand mark and of 2 to 3 micron size together with 50 weight percent of cobalt molding powder.

These two wheels thus prepared having identical abrasive sectors 41a and differing only in that the invention wheel had also sectors 42a while the other one did not, were compared in a cutting test cutting newly laid concrete such as is laid for roadways. In modern practice a concrete roadway is laid continuously without breaks. But slots are required so that, when the concrete shrinks, it will break where desired, thus opening graps for later expansion of the concrete. The two wheels were used on the same concrete which was what is called "preset," that is to say newly laid and not having yet fully set. This is customary practice, namely to cut the concrete which has been preset.

It will be noted that the sectors [42a] *41a* are [thinner] *thicker* than the [sectors 41a] *center 70*. This gives an undercut structure to the wheel which provides for full clearance of the wheel in the cut. The geometry of the wheel having no sectors 42a was the same as the invention wheel only at the location where the sectors 42a were in the invention wheel there was simply steel. At the junction of the steel with the sectors 41a in the wheel having no sectors 42a the wear in mills per 100 feet of cut was 4.68. This corresponds to the spot marked x in Figure 9 where the wear in 100 feet cut was 1.88 mills. At the spot marked y in Figure 9 the wear in mills per 100 feet cut was only .77. The depth of cut was in all cases the same being 2¼ inches. The wear spots x and y and the other one on the other wheel were arcuate grooves.

Wear at the junction of steel with the sectors 41a as high as 4.68 would definitely destroy the wheel before its useful abrasive life had been exhausted. The reduction of this wear by a factor of 2½ gives a satisfactory life to the invention wheels. The diamond abrasive combination of diamonds bonded with cobalt and containing carbide which is essentially a filler gives, for the cutting of concrete, a wheel of long life having low wheel wear and a high cutting rate. I do not have these figures but am certain of the fact that this type of abrasive segment is the best now known for the cutting of concrete which is now done on a large scale. The crux of the invention is the great improvement in wear at the point x and y.

It will thus be seen that there has been provided by this invention a diamond cut-off wheel in which the various objects hereinabove set forth together with many thoroughly practical advantages are successfully achieved. As many possible embodiments may be made of the above invention and as many changes might be made in the embodiment above set forth, it will be understood that all matter hereinbefore set forth or shown in the accompanying drawings is to be interpreted as illustrative and not in a limiting sense.

I claim:

*1.* A diamond cut-off wheel consisting of a disc-shaped center slotted with slots at and inwards from the periphery, metal bonded diamond abrasive sectors welded to the periphery, said sectors consisting of two integral sector parts, a first sector part adjacent and welded to the periphery of the metal center essentially consisting of particles of cobalt bonded carbide of grit size from 80 to 180 with carbide fines finer than 180 all bonded together with cobalt, and a second sector part integral with said first sector part and radially exterior of it essentially consisting of diamond abrasive with sintered carbide particles of grit size smaller than 80, each said particle being carbide bonded with cobalt and cobalt bonding said sintered carbide and said diamond abrasive into an integral [center] *sector,* said second sector having a width greater [than said first sector and greater] than said center.

*2. A diamond cut-off wheel consisting of a disc-shaped center slotted with slots at and inwards from the periphery, metal bonded diamond abrasive sectors welded to the periphery, said sectors consisting of two integral sector parts, a first sector part adjacent and welded to the*

*periphery of the metal center essentially consisting of particles of cobalt bonded carbide of grit size from 80 to 180 with carbide fines finer than 180 all bonded together with cobalt, and a second sector part integral with said first sector part and radially exterior of it comprising*

*diamond abrasive and carbide particles bonded with cobalt into an integral sector, said second sector having a width greater than said center.*

No references cited